United States Patent

Moren et al.

[15] 3,663,251
[45] May 16, 1972

[54] ADDITIVE FOR CONCRETE AND MORTAR

[72] Inventors: Rolf Erhard Moren, Alfredshem; Nils-Erik Ydren, Norrkoping, both of Sweden

[73] Assignees: Mo Och Domsjo Aktiebolag, Ornskoldsvik; Skanski Cementaktiebolaget, Malmo, Sweden

[22] Filed: July 14, 1969

[21] Appl. No.: 842,085

[30] Foreign Application Priority Data

July 15, 1968 Sweden..........................................9673

[52] U.S. Cl.................................106/90, 106/97, 106/314
[51] Int. Cl. .......................................................C04b 7/02
[58] Field of Search.........................................106/90, 97, 314

[56] References Cited

UNITED STATES PATENTS

| | | | |
|---|---|---|---|
| 2,485,102 | 10/1949 | MacPherson | 106/90 |
| 2,081,642 | 5/1937 | Scripture | 106/90 |
| 2,648,645 | 8/1953 | Boris et al. | 106/90 |

*Primary Examiner*—James E. Poer
*Attorney*—Janes & Chapman

[57] ABSTRACT

The invention relates to an additive or mixture for improving the workability and strength and reducing the air content of inorganic binder, and especially hydraulic cement-containing compositions such as concrete and mortar. The additive comprises sulphite waste liquor and certain polyalkylene glycols and their derivatives. The invention also relates to the binder-containing compositions comprising the additive and methods of making the same.

9 Claims, No Drawings

ADDITIVE FOR CONCRETE AND MORTAR

The invention relates to an additive for improving the workability and strength and reducing the air content of concrete, mortar and similar compositions containing an inorganic binding agent, such as a hydraulic cement such as Portland cement.

It has previously been known to used admixtures and additives in connection with Portland cement in cement-containing mixtures such as concrete and mortar to permit a reduction in the water-cement ratio so that the resulting concrete will have improved strength. It has also been proposed to use other additives to retard the setting of cement mixtures. Sulphite waste liquor is among such proposed additives, but its use often results in an increased air content in the mixtures, depending also upon other things, such as the quality of the cement and the nature and grading of the sand and aggregate. Except for certain special applications, it is undesirable to increase the air content of concrete.

For example, if 0.4 percent by weight of powdered sulphite waste liquor solids, based on the amount of the binding agent such as Portland cement, is added to a concrete mixture containing 310 kgs. cement/m$^3$ of concrete, with a water-cement ratio of 0.56, an air content of 7.8 percent is obtained, based on the volume of the concrete. Without the powdered sulphite waste liquor solids, the same concrete mixture has a water-cement ratio of 0.63 and an air content of only 1.9 percent. Thus it is obvious from the above data that sulphite waste liquor, which is one of the cheapest and most commonly used additives for retarding the rate of setting and reducing the water-cement ratio, causes an increase in the air content, and an increase in strength achieved by a lower water-cement ratio may be more or less counter-balanced by a loss in strength due to increased air content in the concrete.

An object of the present invention is to produce a concrete or mortar which is relatively free of air pores and as strong as possible in order to make use of the optimal binder and adhesive forces of the cement.

Another object of the present invention is to prepare concrete and mortar of enhanced workability during the mixing and molding procedures, i.e., the product should be easily compressed by means of vibration or other methods, and during mixing and molding the product should not show a significant tendency to separate.

Another object of the present invention is to prepare a concrete or mortar which is relatively non-corrosive.

Finally, an object of the present invention is to provide an additive comprising sulphite waste liquor for use in concrete and mortar which does not appreciably increase the air content of the concrete or mortar. With the additive of the invention it is possible to obtain improved workability, a reduced water-separation, a reduction in air content and an improvement in strength.

The additive of the present invention is characterized by the combination of (1) sulphite waste liquor and (2) a polyalkylene glycol or derivative thereof having in a 1 percent solution in water a surface tension of more than 50 dynes per cm. at 25° C.

We are aware that U.S. Pat. No. 2,081,642, granted May 25, 1937, describes the addition to concrete of sulphite waste liquor together with calcium chloride (or other chloride walt) as an essential ingredient. This patent does not describe any additive containing a polyalkylene glycol, and the additive of the patent has the disadvantage described previously. In addition, the presence of the chloride renders the concrete corrosive.

U.S. Pat. No. 2,307,741, granted Jan. 12, 1943, describes the addition of polyethylene glycol, polyethylene glycol esters of polyethylene glycol ethers to concrete. There is no disclosure of the addition of sulphite waste liquor together with the glycol. As will be shown subsequently in the data, if polypropylene glycol is used alone, one obtains as a rule an increase in the air content, which reduces the strength of the concrete as compared with a control.

U.S. Pats. No. 3,008,843, granted Nov. 14, 1961, and No. 3,232,777, granted Feb. 1, 1966, describe certain additives for concrete containing surface-active agents. However, these agents give a 1 percent solution having a surface tension below 45 dynes/cm. with the result that the concrete has a high air content due to the low surface tension (high surface activity) of the additive.

The sulphite waste liquor used as one of the ingredients of the additive is a by-product of chemical pulping of wood or cellulose by means of the sulphite method. In this method, the wood or cellulose is treated with a cooking "acid" which consists of an aqueous solution of a bisulphite, prepared by reacting a carbonate or hydroxide such as sodium carbonate or hydroxide, calcium carbonate or hydroxide, magnesium carbonate or hydroxide, or ammonium hydroxide with an excess of sulfur dioxide. Hence, it is often said that the cooking "acid" is "based on" calcium, magnesium, sodium or ammonium, respectively. A typical composition (Pulping Processes, Rydholm, page 774, Interscience Publishers, New York (1965)) is as follows:

SULPHITE WASTE LIQUOR (TOTAL SOLIDS 12–16%)

| Component | | % of total solids |
|---|---|---|
| Lignosulfonate (of which 43 lignin and 9 sulfonate) | | 52 |
| Extractives | | 3 |
| Poly- and oligosaccharides | | 6 |
| Monosaccharides | | 23 |
| Galactose | 3 | |
| Glucose | 3 | |
| Mannose | 11 | |
| Arabinose | 1 | |
| Xylose | 5 | |
| Glucuronic acid | | 1 |
| Aldonic acids | | 4 |
| Sugarsulfonates | | 3 |
| Acetic acid | | 2 |
| Methanol | | 1 |
| Base or alkali | | 5 |
| Total | | 100 % |

In the preferred embodiment, the base is sodium.

The sulphite waste liquor that can be used in accordance with the present invention is a well known article of commerce and is described in detail in many publications and patents. The sulphite waste liquor consists primarily of lignosulfonate or salts thereof as shown in the above table. The waste liquor is suitable when the liquor is obtained with a cooking acid based on sodium, calcium, magnesium or ammonium, preferably sodium or calcium.

The sulphite waste liquor used in accordance with the present invention can have the sugar content reduced by fermentation either wholly or partially. As is well known in the treatment of sulphite waste liquor, all or part of the sugars therein can be fermented to produce alcohol and the alcohol distilled off. The reference to sulphite waste liquor as used herein refers to the material as obtained from the pulping process or in which the sugars have been reduced to alcohol by fermentation and separated. The sulphite waste liquor can be wholly or partially neutralized, and in addition it can have the water removed by evaporation to any extent desired. If the water is evaporated by any known drying process the sulphite waste liquor solids can be in the form of a powder, granules or flakes. If the sulphite waste liquor is not dried to a solid, it can be used as a liquid. The relative amount to be employed is computed herein based on the solids content thereof.

The polyalkylene glycols and their derivatives used as an ingredient of the additive of the present invention must be at least sufficiently water-soluble to form an aqueous solution in the amount used in the concrete or mortar. Their surface tension in a 1 percent solution in water at 25° C. is higher than 50 dynes/cm. Surface active agents have a higher surface activity; that is, they lower the surface tension to appreciably below 50 dynes/cm. at 25° C. at the same concentration. Surface active agents lowering surface tension to less than about 45 dynes/cm. have too high a surface activity for use in concrete; they are known to result in concrete or mortar with a high air content. Such compounds cannot be used according to the present invention, since they impart low strength to the concrete or mortar.

Since the polyalkylene glycol must enter into the aqueous phase in the concrete, the polyalkylene glycol used in the formulation must have such solubility that when used in the requisite amount all of it will dissolve in the water phase in the concrete or mortar. For example, if the amount of the polyalkylene glycol used is 1.0 percent based on the water in the concrete or mortar, then the particular polyalkylene glycol selected for inclusion in the additive must be soluble in water to at least 1.0 percent. Any glycol having solubilities greater than this limit are freely usable, and most of the polyalkylene glycols in accordance with the invention are highly soluble in water.

The polyalkylene glycols used in the present invention, for example, can have the following general formula:

HOAO[ AO ]$_x$ OR where R is hydrogen, a hydrocarbon radical or

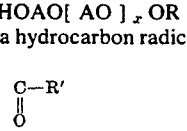

, where R' is a hydrocarbon radial, A is -CH$_2$CH$_2$-, -CH$_2$CH$_2$CHB2- or

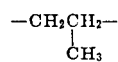

, and $x$ is an integer.

When the polyalkylene glycol is a polyethylene glycol it can have the following formula:

HOCH$_2$CH$_2$O (CH$_2$CH$_2$O )$_n$ CH$_2$CH$_2$OR and when the polyalkylene glycol is polypropylene glycol it can have the following formulae:

HOCH$_2$CH$_2$CH$_2$O[ CH$_2$CH$_2$CH$_2$O]$_m$ CH$_2$CH$_2$CH$_2$OR

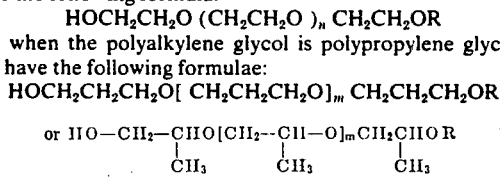

where the numbers $n$ and $m$ are such that the polyethylene glycol has a molecular weight of from 1,000 to 10,000, and the polypropylene glycol has a molecular weight of from 134 to 5,800, preferably from 200 to 2,000. The products having a molecular weight within this range have a surface tension of more than 50 dynes/cm. at 25° C. in a 1 percent aqueous solution.

When one of the terminal hydroxy groups in the polyalkylene glycols has the hydrogen replaced by R, R may be an alkyl, cycloalkyl, aralkyl, alkaryl, alkylene or aromatic radical having up to 18 carbon atoms. R, for example, may be methyl, ethyl, propyl, butyl, hexyl, octyl, stearyl, etc.; benzyl, tolyl, etc.; cyclohexyl; butylene or octylene; etc. These derivatives are known as polyalkylene glycol ethers and are well known in the art. If R is

it may be an aliphatic, aromatic, or cycloaliphatic acyl radical having up to 18 carbon atoms, such as acetyl, stearoyl, oleoyl, benzoyl, toluoyl, etc. These derivatives are well known in the art as polyalkylene glycol esters. In the case of the ether and ester derivativatives the molecular weight should not be increased beyond the upper limit recited heretofore, and the substitution of the hydrogen by the radical R should not render the compound less soluble than the limits recited heretofore.

Another type of polyalkylene glycol that can be employed is the block polymer of ethylene oxide and propylene oxide, with corresponding molecular weights, of the type sold by Wyandotte under the trade name PLURONIC, which are described in U.S. Pat. No. 2,674,619, the disclosure of which is incorporated by reference.

The amount of ethylene oxide and propylene oxide is such that the polymers have the requisite solubility and surface tension as described previously.

Another type of polyalkylene glycol is available commercially under the trademark TETRONIC. These ethylene oxide adducts of an aliphatic diamine such as ethylene diamine extended with propylene oxide have the following formula:

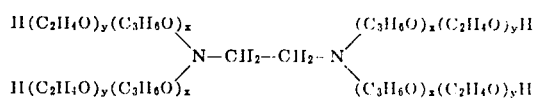

Compounds of this type are described in U.S. Pat. No. 3,250,719, the disclosure of which is incorporated by reference. Values of $x$ and $y$ are such that the polymers have the requisite solubility and surface tension as described previously.

Polyalkylene glycols vary from liquids to waxy solids, and in the event they are liquids, they can be absorbed on any absorbent material such as diatomaceous earth, clay, etc. or they can be absorbed on waste sulphite liquor if it is in dry form.

The amount of the sulphite waste liquor (on a dry basis) employed is within the range from about 0.01 to about 2 percent, preferably from 0.1 to 2 percent. The amount of the polyalkylene glycol is within the range of about 0.001 to about 1 percent, preferably 0.01 to 1 percent. All of the above amounts are by weight based on the dry weight of the inorganic binder or hydraulic cement such as the Portland cement that is employed in the concrete or mortar. When the two ingredients are mixed together and sold as such to concrete and cement manufacturers or users, the sulphite waste liquor may be in an amount within the range from about 0.01 to about 2 parts by weight, on a dry basis, and the polyalkylene glycol or ether or ester thereof may be in an amount within the range from about 0.001 to about 1 part by weight.

The additive can be incorporated in the cement in various ways. Both the ingredients may be premixed and marketed as a solid additive, and added to the concrete or mortar at the time it is prepared, especially if the polyalkylene glycol is a solid. If it is a liquid it can be absorbed on dry absorbent material such as diatomaceous earth or alternatively, the sulphite waste liquor can be mixed in with the cement at any stage of its manufacture if the sulphite waste liquor is in a dry powdered form, and the polyalkylene glycol can be added to the concrete or mortar at the time of mixing, especially if it is a liquid. As another alternative, both the sulphite waste liquor and the glycol can be marked as a liquid solution, and this solution added to the water in the correct amount before the water is added to the concrete mixture. In still another alternative the additive according to the invention can be added at the slaking of the lime hydrate if lime is used, or at the grinding of any ingredient to go in the cement such as ground limestone, granite, feldspar, silica, etc. or of a mixture of cement clinker and stone material. The order in which the ingredients are added to the concrete and whether premixed or added separately is not critical as long as both are present in the concrete or mortar at the time of mixing, within the ranges specified.

It is of course possible to include other known additives in order to modify setting conditions in the finished product.

The additive of the present invention imparts to concrete and mortar a better workability and a lower controlled air content, which results in good casting and application processes as well as homogeneous distribution in the concrete mixture and reduced separation during transportation and working.

Compositions prepared according to the present invention, furthermore, are non-corrosive, since they are free of chlorides which is of great importance especially for the so-called construction concrete installation.

The admixture or additive according to the invention can be employed with any inorganic binder, such as hydraulic lime, quick lime, hydraulic cement and mixtures of the same, and mixtures of hydraulic cement and lime. The hydraulic lime can be lime having a hydraulic modulus of at least 9, hardening both in air and under water according to the definition in, for example, Bygg-AMA (Allmänna Material och Arbetsbeskrivningar) 1960, page 75 and ASTM designations C51, C5, C6, C10, C141, C206 and C207. The hydraulic cement can be as defined in Statliga Cement-bestämmelserna (Governmental Cement specifications B1 1960 and ASTM designations C91, C150, C175, C205, C340 and C358.).

The types of lime which are commonly used in Sweden are, for example, hydraulic lime for Svenska Skifferolje AB in Kvarntorp, called "Kvarntorps kraftkalk."

Another example of hydrated quick lime without air-entraining agents to be employed with hydraulic cement in mortar composition, is "Kronkalk T" from Karta-Oaxen.

Commonly found hydraulic cements are natural cement, Portland cement, alumina cement, slag cement, puzzolan cement, and the like.

The inorganic filler material used in conjunction with the inorganic binder and the additive of the invention can be any particulate inorganic aggregate such as natural sand, gravel, macadam, stone flour of various types, such as crushed granite, marble, dolomite, quartzite, or sandstone, and also pyrophyllite, vermiculite, kieselguhr and perlite.

The term "mortar" as used herein refers to a binder composition comprising a mixture of an inorganic binder as described above, and sand or other inorganic filler and water, for example according to ASTM designation C 270.

The term "concrete" as used herein refers to a binder composition comprising a mixture of an inorganic binder as described above, an inorganic filler such as crushed rock or gravel which is coarser than the filler used in mortar, and water, for example according to ASTM designation C94 and C387. The coarse filler used in concrete should have a particle size greater than about 8 mm.

The invention is illustrated by the following examples. in which in each example the aggregates (gravel and sand) are identical. All amounts of additives are indicated as dry solid weight of additive in per cent by weight of the amount of inorganic binder.

EXAMPLE 1

Cement quality: Swedish ordinary portland cement of low alkali content (about 0.2% alkali calculated as sodium oxide) and low $C_3A$ (calcium aluminate) content (about 5%).

Cement amount: 300 kg./m.$^3$ of concrete.

Concrete consistency: Plastic, Vebe about 5 (see Note a).

|  | Additive |  |  |  |  |  |
|---|---|---|---|---|---|---|
|  | None | 0.10% PPG 1200 | 0.30% SL | 0.30% SL plus 0.015% PEG 1500 | 0.30% SL plus 0.015% PEG 6000 | 0.30% SL plus 0.015% PPG 1200 |
| Water cement ratio | 0.56 | 0.56 | 0.49 | 0.49 | 0.49 | 0.49 |
| Air content, percent by volume (see Note b) | 1.1 | 2.0 | 3.9 | 3.1 | 3.6 | 1.6 |
| Compressive strength, kg./cm.$^2$ (see Note b): |  |  |  |  |  |  |
| After 1 day | 114 | 112 | 112 | 158 | 163 | 185 |
| After 7 days | 321 | 301 | 450 | 475 | 473 | 504 |
| After 28 days | 456 | 446 | 614 | 604 | 614 | 440 |

SL = Fermented sulphite waste liquor from the sodium bisulfite process evaporated to powder was used in this and other examples, and has a composition essentially differing from the unfermented sulphite waste liquor composition by the absence of hexoses including galactose, glucose and mannose as well as poly- and oligosaccarides of hexose type, which have almost completely disappeared during the fermentation, and by the presence of a residue of about 1% of yeast and phosphates added to the fermentation process.

PEG 1500 = Polyethylene glycol with a molecular weight of 1500.
PEG 6000 = Polyethylene glycol with a molecular weight of 6000.
PPG 1200 = Polypropylene glycol with a molecular weight of 1200.

Note a: The Vebe time is determined by the Vebe method in which a conical mold of the freshly mixed concrete is placed on a vibrating table which oscillates about 2,900 oscillations per second, at an amplitude of about 0.5 mm. The time it takes to level out the cone is determined in seconds, and is called the Vebe. This number indicates the consistency of the concrete. A Vebe of 1.5 to 3 indicates a viscous slow flowing concrete. A Vebe of 3 to 5 indicates that the concrete is in a plastic condition, and a Vebe of 5 to 10 indicates that the concrete has a medium rigidity (see further Journal of Materials 2 (1967): 3, pages 519–536).

Note b: The air content and compressive strength in this and in the following examples were tested in accordance with Swedish Standard B5-1965, which as regards air content corresponds to ASTM C173-58, and as regards to compressive strength corresponds to ASTM C39-61.

The additives enable a decrease of the water cement ratio from 0.56 to 0.49.

EXAMPLE 2

Series A

Cement quality: Swedish ordinary portland cement of low alkali content (about 0.2% alkali calculated as sodium oxide) and low $C_3A$-(calcium aluminate) content (about 5%).

Cement amount: 310 kg./m.$^3$ of concrete.

Concrete consistency: Viscous (see Note a).

Comparative tests without and with additives according to the present invention gave the following results:

|  | Additive |  |  |  |  |
|---|---|---|---|---|---|
|  | None | 0.02% PPG 1200 | 0.40% SL | 0.40% SL plus 0.06% PPG 1200 | 0.40% SL plus 0.02% PPG 1200 |
| Water cement ratio | 0.63 | 0.63 | 0.55 | 0.55 | 0.54 |
| Air content, percent by volume | 1.4 | 1.8 | 4.8 | 3.5 | 2.7 |
| Compressive strength, kg./cm.$^2$ after: |  |  |  |  |  |
| 1 day | 72 | 70 | 80 | 98 | 84 |
| 7 days | 285 | 279 | 320 | 385 | 405 |
| 28 days | 425 | 408 | 420 | 500 | 505 |

Note a: The consistency of the concrete in this and all of the following examples is determined according to Swedish Standard B5-1965, 6:313, which corresponds substantially to ASTM C172-54 for sampling, and ASTM C143-58 for testing.

Series B

Cement quality: Swedish ordinary Portland cement of high alkali content (about 1.1% alkali calculated as sodium oxide) and high $C_3A$-(calcium aluminate) content (about 10%).

Cement amount: 310 kg., m.$^3$ of concrete.

Concrete consistency: Viscous (see note a).

Comparative tests without any additives gave the following results:

| | |
|---|---|
| Water cement ratio: | 0.63 |
| Air content, percent by volume: | 1.9 |
| Compressive strength, kg/cm² | |
| After 7 days: | 275 |
| After 28 days: | 345 |

When 0.4 percent by weight of fermented sulphite waste liquor from the sodium bisulfite process were added the following results were obtained:

| | |
|---|---|
| Water cement ratio: | 0.56 |
| Air content, percent by volume: | 7.8 |
| Compressive strength, kg/cm² | |
| After 7 days: | 255 |
| After 28 days: | 335 |

When 0.4 percent by weight of fermented sulphite waste liquor from the sodium bisulfite process and 0.006 percent by weight of polypropylene glycol with an average molecular weight of 1,200 were added the following results were obtained:

| | |
|---|---|
| Water cement ratio: | 0.58 |
| Air content, percent by volume: | 3.6 |
| Compressive strength, kg/cm² | |
| After 7 days: | 330 |
| After 28 days: | 425 |

When 0.4 percent by weight of fermented sulphite waste liquor from the sodium bisulfite process and 0.02 percent by weight of polypropylene glycol with an average molecular weight of 1,200 were added the following results were obtained:

| | |
|---|---|
| Water cement ratio: | 0.58 |
| Air content, percent by volume: | 2.7 |
| Compressive strength, kg/cm² | |
| After 7 days: | 325 |
| After 28 days: | 420 |

The tests in this example were carried out with an aggregate which tends to give an air pore content.

EXAMPLE 3

Series A
| | |
|---|---|
| Cement quality: | Swedish Ordinary Portland Cement of low alkali content (about 0.2% calculated as sodium oxide) and low $C_3A$-content (about 5%) |
| Cement amount: | 300 kg/cm² |
| Concrete consistency: | Plastic |

A comparative test without any additives gave the following results:

| | |
|---|---|
| Water cement ratio: | 0.56 |
| Air content, percent by volume | 1.1 |
| Compressive strength, kg/cm² | |
| After 7 days: | 320 |
| After 28 days: | 455 |

When 0.4 percent by weight of fermented sulphite waste liquor from the sodium bisulfite process and 0.02 percent by weight of polypropylene glycol with an average molecular weight of 1,200 were added the following results were obtained:

| | |
|---|---|
| Water cement ratio: | 0.49 |
| Air content, percent by volume | 1.9 |
| Compressive strength kg/cm² | |
| After 7 days: | 495 |
| After 28 days: | 620 |

Series B

| | |
|---|---|
| Cement quality: | Swedish Ordinary Portland Cement of high alkali content (about 1.1% alkali calculated and sodium oxide) and high $C_3A$ (calcium aluminate) content (about 10%) |
| Cement amount: | 300 kg/m³ |
| Concrete consistency: | Plastic |

A comparative test without any additives gave the following results:

| | |
|---|---|
| Water cement ratio: | 0.58 |
| Air content, percent by volume | 1.7 |
| Compressive strength, kg/cm² | |
| After 7 days: | 360 |
| After 28 days: | 450 |

When 0.6 percent by weight of fermented sulphite waste liquor from the sodium bisulfite process and 0.03 percent by weight of polypropylene glycol with an average molecular weight of 1,200 were added the following results were obtained:

| | |
|---|---|
| Water cement ratio: | 0.50 |
| Air content, percent by volume | 1.4 |
| Compressive strength, kg/cm² | |
| After 7 days | 470 |
| After 28 days | 605 |

Having regard to the foregoing disclosure, the following is claimed as the inventive and patentable embodiments thereof:

1. An additive for concrete and mortar containing an inorganic binding agent, consistently essentially of (1) an amount within the range from about 0.01 to about 2 parts by weight of sulfite waste liquor on a dry basis and (2) an amount within the range from about 0.001 to about 1 part by weight of polyalkylene compound selected from the group consisting of polyalkylene glycols, and ethers and esters thereof which is at least partially soluble in water and which in a 1 percent aqueous solution has a surface tension of more than 50 dynes/cm at 25° C.

2. The additive of claim 1 in which the polyalkylene glycol is a polyethylene glycol having a molecular weight of from 1,000 to 10,000.

3. The additive of claim 1 in which the polyalkylene glycol is a polypropylene glycol having a molecular weight of from 134 to 5,800.

4. The additive of claim 1, characterized in that the sulphite waste liquor is in solid form.

5. A method of making, shaping and hardening a cementitious mixture containing an inorganic binding agent which comprises incorporating in the inorganic binding agent a filler, water, and an amount of an additive consisting essentially of (1) an amount within the range from about 0.01 to about 2 parts by weight of sulfite waste liquor on a dry basis and (2) an amount within the range from about 0.001 to about 1 part by weight of a polyalkylene compound selected from the group consisting of polyalkylene glycols, and ethers and esters thereof which is at least partially soluble in water and which in a 1 percent aqueous solution has a surface tension of more than 50 dynes/cm at 25° C. to provide an amount of sulfite waste liquor on a dry basis within the range from about 0.01 to about 2 percent by dry weight of the inorganic binding agent, and an amount of the polyalkylene glycol or ether or ester thereof within the range from about 0.01 to about 1 percent based on the dry weight of the inorganic binding agent, and shaping the mixture and permitting it to harden.

6. A method of making concrete containing Portland cement as the essential inorganic binding agent which comprises incorporating in the cement, sand, aggregate and water, and an amount of an additive consisting essentially of (1) an amount within the range from about 0.01 to about 2 parts by weight of sulfite waste liquor on a dry basis and (2) an amount within the range from about 0.001 to about 1 part by weight of a polyalkylene compound selected from the group consisting of polyalkylene glycols, and ethers and esters thereof which is at least partially soluble in water and which in a 1 percent aqueous solution has a surface tension of more than 50 dynes/cm at 25° C. to provide an amount of sulfite waste liquor on a dry basis within the range from about 0.01 to about 2 percent by dry weight of the inorganic binding agent, and an amount of the polyalkylene glycol or ether or ester thereof within the range from about 0.01 to about 1 percent based on the dry weight of the inorganic binding agent, and shaping the mixture and permitting it to harden.

7. Mortar containing an inorganic binding agent, a filler, water, and an additive consisting essentially of (1) an amount within the range from about 0.01 to about 2 parts by weight of sulfite waste liquor on a dry basis and (2) an amount within the range from about 0.001 to about 1 part by weight of a polyalkylene compound selected from the group consisting of polyalkylene glycols, and ethers and esters thereof which is at least partially soluble in water and which in a 1 percent aqueous solution has a surface tension of more than 50 dynes/cm at 25° C.

8. Concrete containing Portland cement as the essential binding agent, sand, aggregate, water, and an additive consisting essentially of (1) an amount within the range from about 0.01 to about 2 parts by weight of sulfite waste liquor on a dry basis and (2) an amount within the range from about 0.001 to about 1 part by weight of a polyalkylene compound selected from the group consisting of polyalkylene glycols, and ethers and esters thereof which is at least partially soluble in water and which in a 1 percent aqueous solution has a surface tension of more than 50 dynes/cm at 25° C.

9. Concrete containing an inorganic binding agent, a filler, water, and an additive consisting essentially of (1) an amount within the range from about 0/01 to about 2 parts by weight of sulfite waste liquor on a dry basis and (2) an amount within the range from about 0.001 to about 1 part by weight of a polyalkylene compound selected from the group consisting of polyalkylene glycols, and ethers and esters thereof which is at least partially soluble in water and which in a 1 percent aqueous solution has a surface tension of more than 50 dynes/cm at 25° C.

* * * * *

PO-1050
(5/69)

UNITED STATES PATENT OFFICE
CERTIFICATE OF CORRECTION

Patent No. __3,663,251__    Dated __May 16, 1972__

Inventor(s) __Rolf Erhard Moren et al.__

It is certified that error appears in the above-identified patent and that said Letters Patent are hereby corrected as shown below:

Column 3, line 32   :   "$CH_2CH_2CHB$ -OR" should be
--$CH_2CH_2CH_2$-OR--

Column 6, line 3    :   After "examples ", delete the period
--.--

Column 6, Ex. 1,    :   "After 28 days", last column, "440" should
line 25                 be --640--

Signed and sealed this 8th day of May 1973.

(SEAL)
Attest:

EDWARD M. FLETCHER, JR.                ROBERT GOTTSCHALK
Attesting Officer                      Commissioner of Patents